US010310671B2

(12) United States Patent
Tsai et al.

(10) Patent No.: US 10,310,671 B2
(45) Date of Patent: Jun. 4, 2019

(54) TOUCH SENSOR DEVICE

(71) Applicant: HIMAX TECHNOLOGIES LIMITED, Tainan (TW)

(72) Inventors: Cheng-Hung Tsai, Tainan (TW); Xuexia Cai, Tainan (TW); Yuan-Ting Chen, Tainan (TW); Jui-Ni Li, Tainan (TW); Wai-Pan Wu, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 123 days.

(21) Appl. No.: 15/581,717

(22) Filed: Apr. 28, 2017

(65) Prior Publication Data

US 2018/0314386 A1    Nov. 1, 2018

(51) Int. Cl.
*G06F 3/041*     (2006.01)
*G09G 3/36*      (2006.01)
*G06F 3/044*     (2006.01)

(52) U.S. Cl.
CPC .......... *G06F 3/0418* (2013.01); *G06F 3/044* (2013.01); *G06F 2203/04107* (2013.01)

(58) Field of Classification Search
CPC ...... G06F 3/0412; G06F 3/0416; G06F 3/044; G06F 2203/04101; G06F 2203/04107; G06F 2203/04108
See application file for complete search history.

(56) References Cited

U.S. PATENT DOCUMENTS

2014/0332361 A1* 11/2014 Huang ............... H03K 17/9622
                                                    200/5 A
2016/0313851 A1* 10/2016 Dorfner ............... G06F 3/0416
2018/0217711 A1*  8/2018 Teranishi ............. G06F 3/0416

FOREIGN PATENT DOCUMENTS

| CN | 102985900 | 3/2013 |
| CN | 104142765 | 11/2014 |
| TW | M447539   | 2/2013 |
| TW | 201337700 | 9/2013 |
| TW | 201445375 | 12/2014 |

OTHER PUBLICATIONS

"Office Action of Taiwan Counterpart Application," dated Nov. 17, 2017, p. 1-p. 6, in which the listed references were cited.

* cited by examiner

*Primary Examiner* — Nelson M Rosario
(74) *Attorney, Agent, or Firm* — J.C. Patents

(57) ABSTRACT

A touch sensor device provided herein includes a sensor pad disposed on a carrier, wherein the sensor pad includes a first electrode, a second electrode, a third electrode and a grounding electrode. The first electrode surrounds a periphery of the second electrode and a first gap is formed between the first electrode and the second electrode. The first electrode surrounds a periphery of the third electrode, and a second gap is formed between the first electrode and the third electrode. The grounding electrode surrounds a periphery of the pad sensor, wherein a third gap is formed between the first electrode and the grounding electrode.

11 Claims, 9 Drawing Sheets

TOUCH SENSOR DEVICE

BACKGROUND OF THE INVENTION

1. Field of the Invention

The present invention generally relates to an electronic device, in particular, to a touch sensor device.

2. Description of Related Art

More and more electronic devices are equipped with touch sensing function so as to provide a more convenient operation means. Accordingly, the touch sensing technique is developed flourishingly in recent decades. One of the popular touch sensing techniques is a projected capacitive touch sensor device, in which the touch sensor include a sensing electrode and a transmission electrode formed in a coplanar manner, and the sensing electrode and the transmission electrode are capable of being electrically coupled to each other to form the sensing capacitance. In the case a conductive object such as a finger of the user approaches or contacts the touch sensor, the sensing capacitance varies accordingly and the variation of the sensing capacitance is served as the touch sensing signal for the determination of the touch activity. However, in a case a water drop is generated at the location of the touch sensor, the sensing capacitance may vary accordingly, which causes a ghost point touch sensing signal. Therefore, the touch sensing device requires distinguishing the ghost point touch sensing signal from the actual touch sensing signal.

SUMMARY OF THE INVENTION

Accordingly, the present invention is directed to a touch sensor device having a sensor pad capable of distinguishing a ghost point touch sensing signal from an actual touch sensing signal.

In accordance with an embodiment of the disclosure, a touch sensor device includes a sensor pad disposed on a carrier, wherein the sensor pad includes a first electrode, a second electrode, a third electrode and a grounding electrode. The first electrode surrounds a periphery of the second electrode and a first gap is formed between the first electrode and the second electrode. The first electrode surrounds a periphery of the third electrode, and a second gap is formed between the first electrode and the third electrode. The grounding electrode surrounds a periphery of the pad sensor, wherein a third gap is formed between the first electrode and the grounding electrode.

In accordance with an embodiment of the disclosure, the first electrode, the second electrode and the third electrode are coplanar.

In accordance with an embodiment of the disclosure, the first electrode, the second electrode, the third electrode and the grounding electrode are coplanar.

In accordance with an embodiment of the disclosure, the first electrode is located between the second electrode and the third electrode.

In accordance with an embodiment of the disclosure, the first electrode is located between the second electrode and the grounding electrode.

In accordance with an embodiment of the disclosure, the first electrode is located between the third electrode and the grounding electrode.

In accordance with an embodiment of the disclosure, a shielding film is further disposed on the carrier and located at a side of the sensor pad, wherein the shielding film reveals the sensor pad.

In accordance with an embodiment of the disclosure, a backside shielding film is further disposed on the carrier, wherein the shielding film and the backside shielding film are located at opposite sides of the carrier, and the backside shielding film covers a region corresponding to the sensor pad.

In accordance with an embodiment of the disclosure, the second electrode is electrically coupled to the first electrode to form a first sensing capacitance and electrically coupled to the third electrode to form a second sensing capacitance.

In accordance with an embodiment of the disclosure, the first electrode and the third electrode are asynchronously enabled to perform a touch sensing scan.

In accordance with an embodiment of the disclosure, one of the first electrode and the third electrode is connected to a ground voltage and the other of the first electrode and the third electrode is enabled to perform the touch sensing scan.

In accordance with an embodiment of the disclosure, a pattern of the first electrode is wounded along with the second electrode and the third electrode.

In accordance with an embodiment of the disclosure, the grounding electrode surrounds a region and the first electrode, the second electrode and the third electrode are located within the region.

In view of the above, the touch sensor device according to an embodiment of the present disclosure have four independent electrodes to accurately distinguish a ghost point touch sensing signal from an actual touch sensing signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
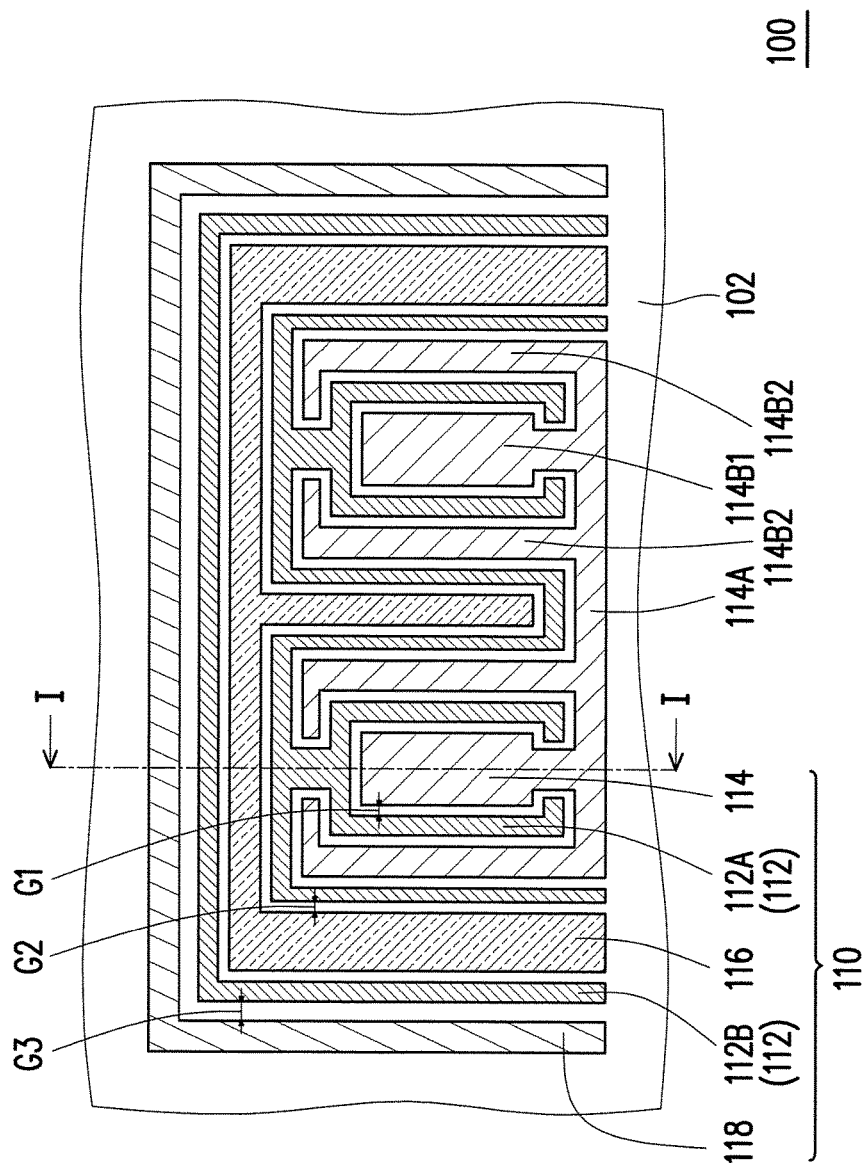
FIG. 1 schematically illustrates a touch sensor device in accordance with an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 schematically illustrates a touch sensor device in accordance with an embodiment of the disclosure. In FIG. 1, a touch sensor device 100 includes a carrier 102 and a sensor pad 110. The carrier 102 may include a substrate, a flexible printed circuit board, or the like. In a case the carrier 102 is a flexible printed circuit board, the sensor pad 110 may be formed by using one conductive layer in the flexible printed circuit board. However, the embodiment is not limited thereto.

Specifically, the sensor pad 110 includes a first electrode 112, a second electrode 114, a third electrode 116 and a grounding electrode 118. The first electrode 112, the second electrode 114, the third electrode 116 and the grounding electrode 118 may be formed in a coplanar manner on the carrier 102. A first gap G1 is formed between the first electrode 112 and the second electrode 114, a second gap G2 is formed between the first electrode 112 and the third electrode 116, and a third gap G3 is formed between the grounding electrode 118 and the first electrode 112. Therefore, the first electrode 112, the second electrode 114, the third electrode 116 and the grounding electrode 118 are not directly electrically or physically connected to one another. In addition, the first electrode 112 surrounds a periphery of the second electrode 114 and a periphery of the third electrode 116. The grounding electrode 118 surrounds a periphery of the sensor pad 110. In the present embodiment, the grounding electrode 118 may have a U-shaped pattern surrounding a rectangular region and the first electrode 112, the second electrode 114, and the third electrode 116 are formed within the rectangular region. In addition, the pattern of the first electrode 112 may be wounded along with the patterns of the second electrode 114 and the third electrode 116. In an alternative embodiment, the region surrounded by the grounding electrode 118 may be determined by the required size and shape of the sensor pad 110 and is not limited to have a rectangular shape.

The second electrode 114 may include a trunk portion 114A and a plurality of protrusion portions 114B1 and 144B2 protruding from the trunk portion 114A, such that the second electrode 114 may have a comb-like pattern. As shown in FIG. 1, the protrusion portions 114B1 and the protrusion portions 114B2 may have different patterns; for example, the protrusion portions 114B1 may have a bending pattern at a terminal and the protrusion portions 114B2 may not. In the present embodiment, one protrusion portion 114B2 is located between two protrusion portions 114B1, but is not limited thereto. In addition, the first electrode 112 may include a first pattern portion 112A extending to the region between adjacent two of the protrusion portions 114B1 and 114B2 and surrounding the outermost ones of the protrusion portions 114B1 and 114B2.

The third electrode 116 is disposed beside the first pattern portion 112A of the first electrode 112 in a manner that the first pattern portion 112A of the first electrode 112 is located between the second electrode 114 and the third electrode 116. In addition, the first electrode 112 may further include a second pattern portion 112B surrounding the third electrode 116 and the grounding electrode 118 surrounds the second pattern portion 112B of the first electrode 112. In other words, the second pattern portion 112B of the first electrode 112 is located between the third electrode 116 and the grounding electrode 118. In the present embodiment, the first pattern portion 112A of the first electrode 112 is electrically connected to the second pattern portion 112B of the first electrode 112 via the touch sensing driving circuit. Alternatively, in another embodiment, the first pattern portion 112A of the first electrode 112 may be electrically connected to the second pattern portion 112B of the first electrode 112 via a modified pattern design by which the first pattern portion 112A and the second pattern portion 112B are in direct contact with or connected to each other.

In the present embodiment, the sensor pad 110 may be connected to a touch sensing driving circuit, and the sensor pad 110 is designed as a projected capacitive touch sensor pad. The first electrode 112 may serve as a first transmission electrode, the second electrode 114 may serve as a sensing electrode, and the third electrode 116 may serve as a second transmission electrode. The first electrode 112 and the third electrode 116 may be asynchronously enabled by the touch sensing driving circuit to perform a touch sensing scan. Specifically, when the first electrode 112 may be enabled to transmit a scanning signal, the second electrode 114 may be electrically coupled to the enabled first electrode 112 to form a first sensing capacitance. When the third electrode 116 may be enabled to transmit a scanning signal, the second electrode 114 may be electrically coupled to the enabled third electrode 116 to form a second sensing capacitance. The touch sensor device 100 may utilize the first sensing capacitance and the second sensing capacitance to determine a touch activity. In one embodiment, the third electrode 116 may be connected to a ground voltage as the grounding electrode 118 when the first electrode 112 is enabled. Alternatively, the first electrode 112 may be connected to a ground voltage as the grounding electrode 118 when the third electrode 116 is enabled. In another example, the third electrode 116 may be floated when the first electrode 112 is enabled. Alternatively, the first electrode 112 may be floated when the third electrode 116 is enabled.

Figure 2A:
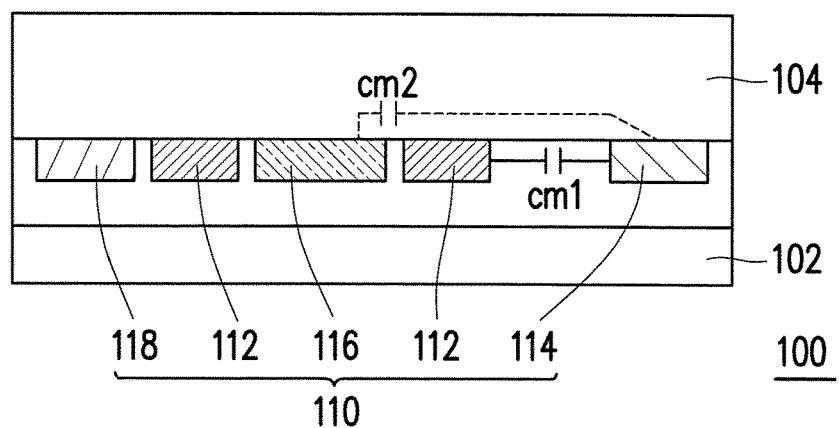
FIG. 2A schematically illustrates a cross section of the touch sensor device of FIG. 1 taken along line I-I.
Figure 2B:
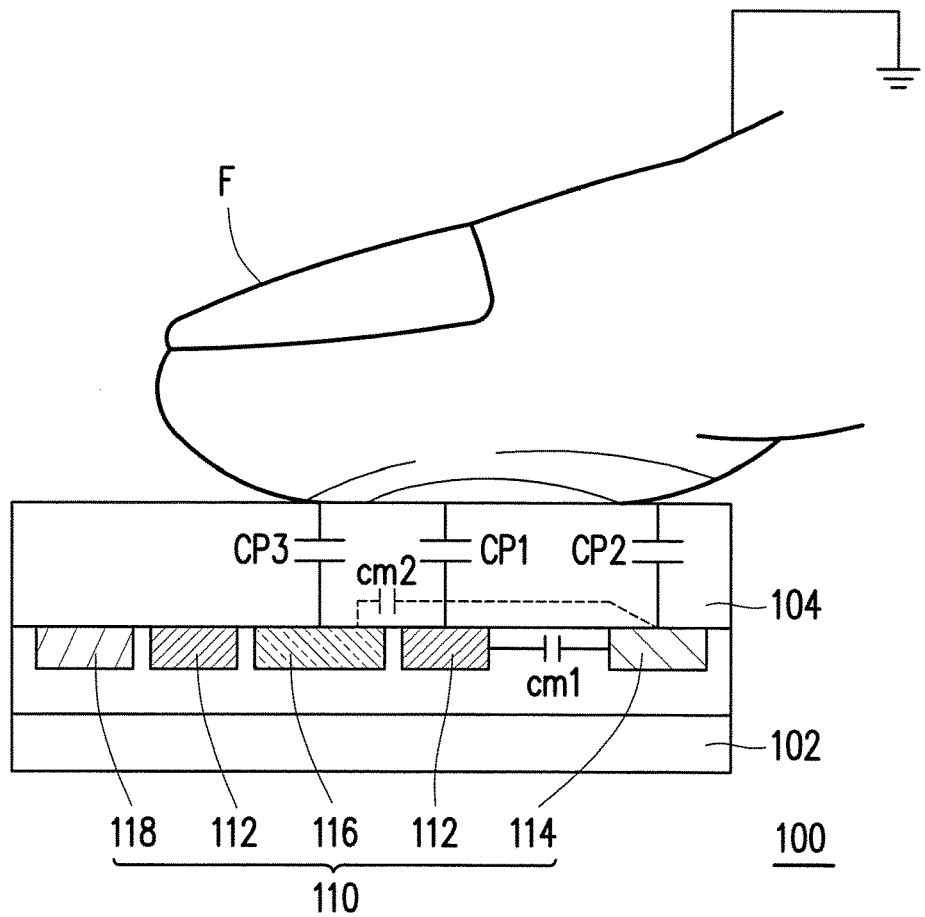
FIG. 2B schematically illustrates a cross section of the touch sensor device where a finger of a user approaches or touches the touch sensor device.
Figure 2C:
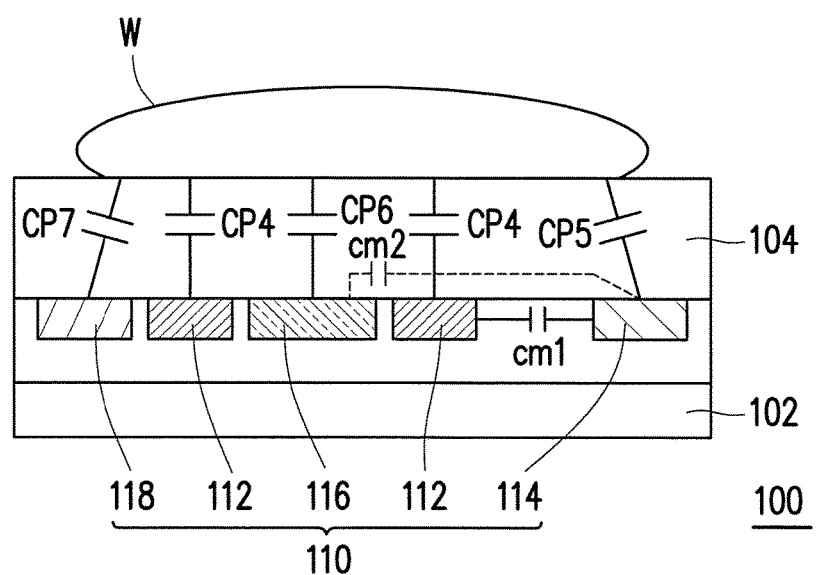
FIG. 2C schematically illustrates a cross section of the touch sensor device where a water drop is generated on the touch sensor device.

Specifically, FIG. 2A schematically illustrates a cross section of the touch sensor device of FIG. 1 taken along line I-I, FIG. 2B schematically illustrates a cross section of the touch sensor device where a finger of a user approaches or touches the touch sensor device, and FIG. 2C schematically illustrates a cross section of the touch sensor device where a water drop is generated on the touch sensor device. As shown in FIG. 2A, in the view of the cross section, the touch sensor device 100 may further includes a covering layer 104 covering the sensor pad 110 on the carrier 102, such that the covering layer 104 may protect the sensor pad 110 from being damaged or broken due to the collision or touch of an external object. The second electrode 114 may be electrically coupled to the first electrode 112 to form a first sensing capacitance cm1 when the first electrode 112 is enabled, and the second electrode 114 may be electrically coupled to the third electrode 116 to form a second sensing capacitance cm2 when the third electrode 116 is enabled.

In the case a finger F of a user approaches or touches the sensor device 100 as shown in FIG. 2B, the finger F may be electrically coupled to the first electrode 112, the second electrode 114 and the third electrode 116 to form a first finger capacitance CP1, a second finger capacitance CP2 and a third finger capacitance CP3. As such, the first sensing capacitance cm1 and the second sensing capacitance cm2 may both be reduced, compared to the first and the second sensing capacitances cm1 and cm2 measured under the situation shown in FIG. 2A.

In the case a water drop W is generated on the sensor device 100 as shown in FIG. 2C, a first water capacitance CP4, a second water capacitance CP5, a water finger capacitance CP6 and a fourth water capacitance CP7 may be generated sue to the highly dielectric property of the water drop W. As such, the first sensing capacitance cm1 may be reduced, compared to the first sensing capacitance cm1 measured under the situation shown in FIG. 2A and the second sensing capacitance cm2 may be increased, compared to the second sensing capacitance cm2 measured under the situation shown in FIG. 2A. Compared with the situation of an actual touch activity as shown in FIG. 2B, the second sensing capacitance cm2 varies in an opposite tendency under the situation that the water drop W is generated on the touch sensor device 100. Therefore, by the configuration of the first electrode 112, the second electrode 114, the third electrode 116 and the grounding electrode 118, the touch sensor device 100 may accurately distinguish the signal of an actual touch activity of the user and the ghost point touch sensing signal caused by the water drop W, without a complex circuit calculation method or algorithm.

Figure 3:
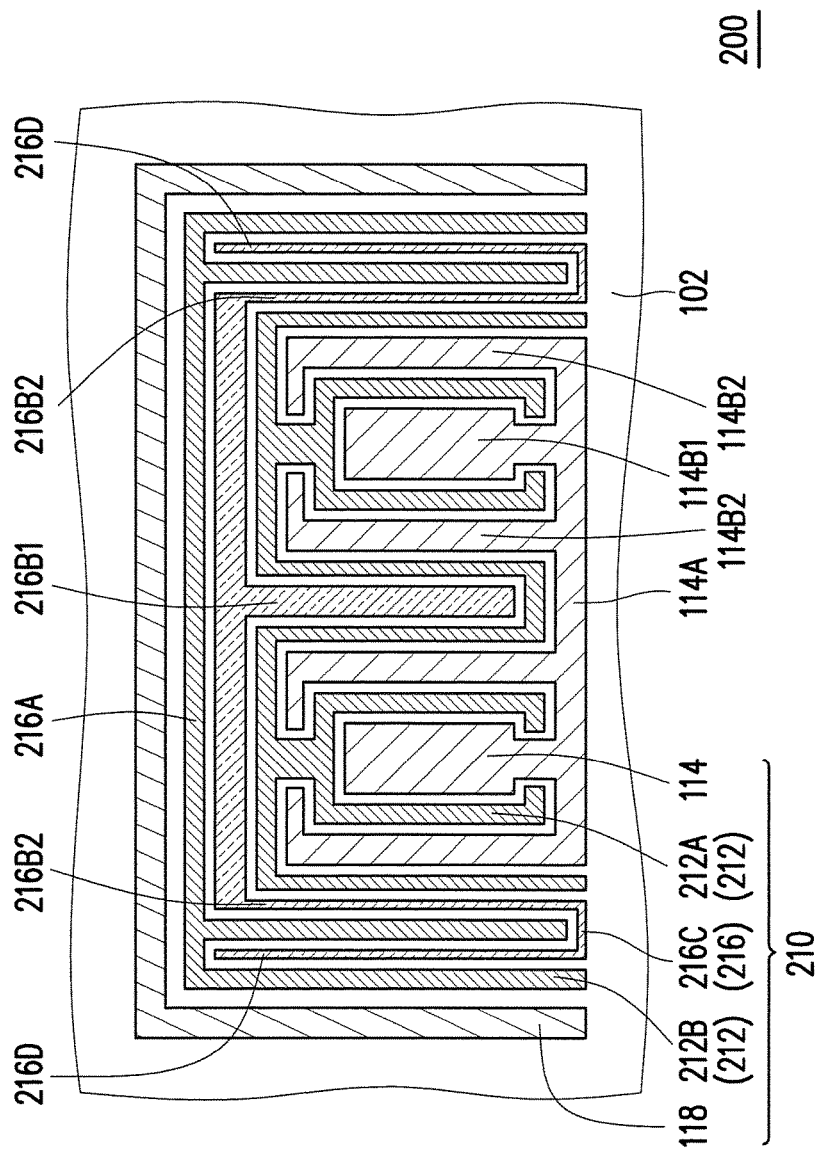
FIG. 3 schematically illustrates a touch sensor device in accordance with another embodiment of the present disclosure.

FIG. 3 schematically illustrates a touch sensor device in accordance with another embodiment of the present disclosure. Referring to FIG. 3, the touch sensor device 200 is substantially similar to the touch sensor device 100 so that the similar or the same reference numbers in the two embodiments may refer to similar or the same components. Specifically, the touch sensor device 200 includes a sensor pad 210 disposed on the carrier 102, in which the sensor pad 210 includes a first electrode 212, a second electrode 114, a third electrode 216 and a grounding electrode 118, and the first electrode 212 includes a first pattern portion 212A and a second pattern portion 212B. Herein, the pattern designs, the functions and the disposition relationships of the first pattern portion 212A of the first electrode 212, the second electrode 114 and the grounding electrode 118 may refer to the embodiment of FIG. 1 and are not reiterated. In addition, the functions and the disposition relationships of the second pattern portion 212B of the first electrode 212 and the third electrode 216 may refer to the second pattern portion 112B of the first electrode 112 and the third electrode 116 of the embodiment depicted in FIG. 1, but the patterns of the second pattern portion 212B of the first electrode 212 and the third electrode 216 are different from the second pattern portion 112B of the first electrode 112 and the third electrode 116.

Specifically, the pattern of third electrode 216 includes a trunk portion 216A, protrusion portions 216B1 and 216B2, connecting portions 216C and tail portion 216D. The protrusion portions 216B1 and 216B2 are connected to and protruded from the trunk portion 216A and the protrusion portion 216B 1 is located between two protrusion portions 216B2 to form a E-like pattern that is clockwise turned 90°. Each of the connecting portions 216C is connected to one protrusion portion 216B2 at an end and extends away the protrusion portion 216B 1 from the corresponding protrusion portion 216B2. Each tail portion 216D is connected to the other end of the connecting portion 216C such that each connecting portion 216C is connected between one protrusion portion 216B2 and one tail portion 216D. The second pattern portion 212B of the first electrode 212 is wounded along with the tail portion 216D, the protrusions portions 216B2 and the trunk portion 216A so that the second pattern portion 212B of the first electrode 212 has a pattern different from the second pattern portion 112B of the first electrode 112 in FIG. 1.

Figure 4:
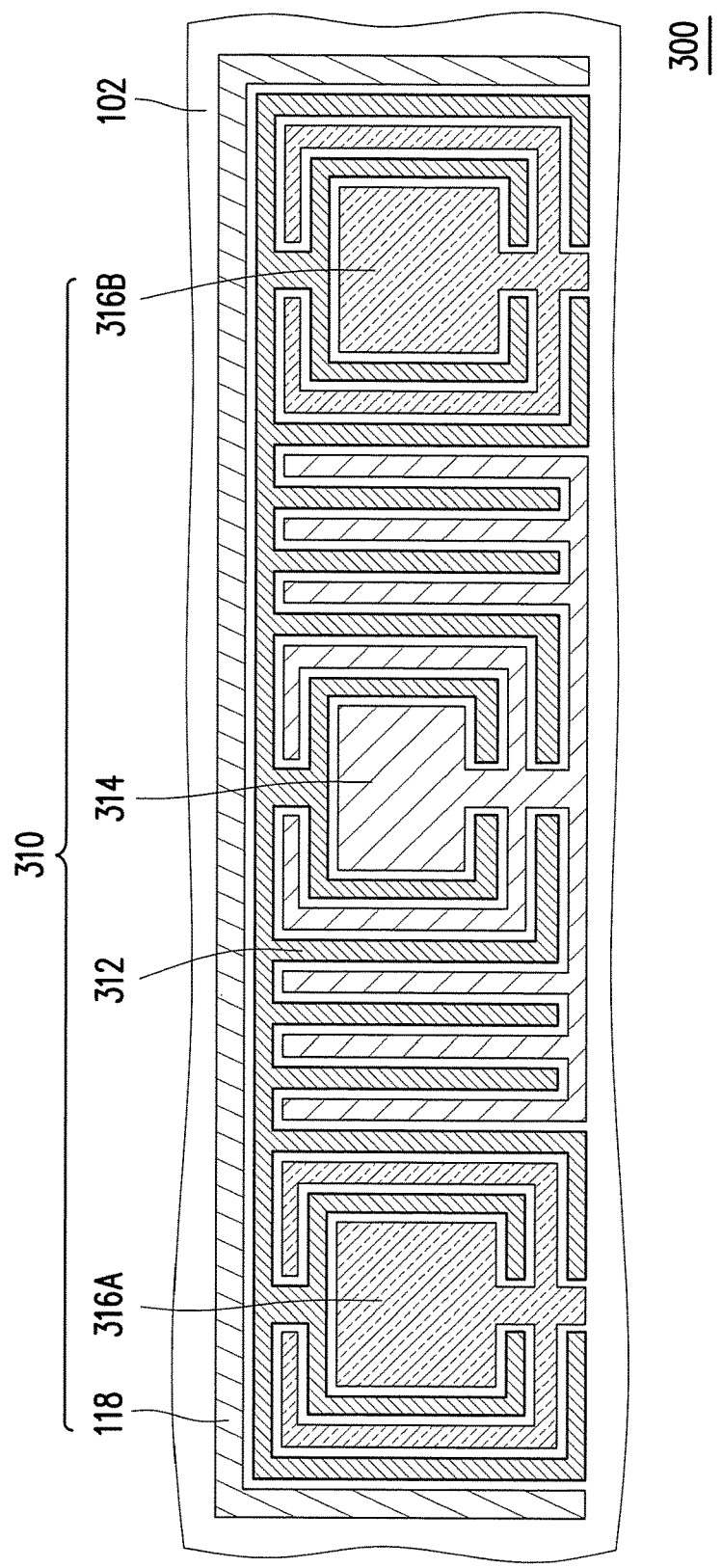
FIG. 4 schematically illustrates a touch sensor device in accordance with another embodiment of the present disclosure.

FIG. 4 schematically illustrates a touch sensor device in accordance with another embodiment of the present disclosure. Referring to FIG. 4, the touch sensor device 300 is substantially similar to the touch sensor device 100 so that the similar or the same reference numbers in the two embodiments may refer to similar or the same components. Specifically, the touch sensor device 300 includes the sensor pad 310 disposed on the carrier 102, in which the sensor pad 310 includes a first electrode 312, a second electrode 314, a third electrode 316 and a grounding electrode 118. Herein, the pattern design, the function and the disposition location of the grounding electrode 118 may refer to the embodiment of FIG. 1 and are not reiterated. In addition, the functions and the disposition relationships of the first electrode 312, the second electrode 314, the third electrode 316 may refer to the first electrode 112, the second electrode 114, the third electrode 116 of the embodiment depicted in FIG. 1, but the patterns of the first electrode 312, the second electrode 314, the third electrode 316 are different from those of the first electrode 112, the second electrode 114, the third electrode 116.

In the present embodiment, the third electrode 316 includes a first pattern portion 316A and a second pattern portion 316B and the second electrode 314 is located between the first pattern portion 316A and the second pattern portion 316B. The first pattern portion 316A and the second pattern portion 316B are electrically connected to each other to serve as one transmission electrode when the sensor pad 310 performs the touch sensing function. The pattern of the first electrode 312 is wounded along with the first pattern portion 316A of the third electrode 316, the second electrode 314 and the second pattern portion 316B of the third electrode 316, and the first electrode 312 is located between the second electrode 314 and the third electrode 316, between the second electrode 314 and the grounding electrode 118, and between the third electrode 316 and the grounding electrode 118.

Figure 5:
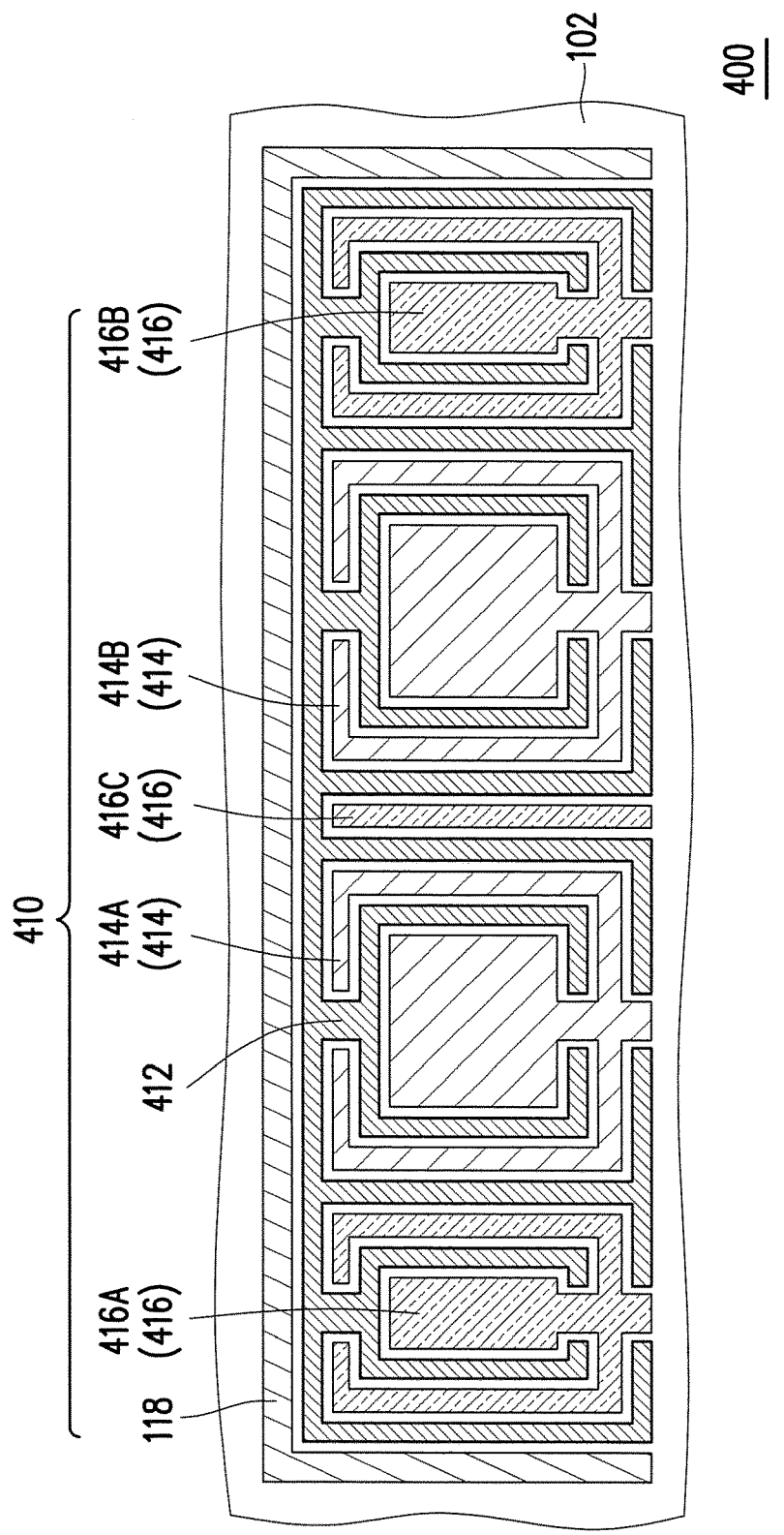
FIG. 5 schematically illustrates a touch sensor device in accordance with another embodiment of the present disclosure.

FIG. 5 schematically illustrates a touch sensor device in accordance with another embodiment of the present disclosure. Referring to FIG. 5, the touch sensor device 400 is substantially similar to the touch sensor device 100 so that the similar or the same reference numbers in the two embodiments may refer to similar or the same components. Specifically, the touch sensor device 400 includes a sensor pad 410 disposed on the carrier 102, in which the sensor pad 410 includes a first electrode 412, a second electrode 414, a third electrode 416 and a grounding electrode 118. Herein, the pattern design, the function and the disposition location of the grounding electrode 118 may refer to the embodiment of FIG. 1 and are not reiterated. In addition, the functions and the disposition relationships of the first electrode 412, the second electrode 414, the third electrode 416 may refer to the first electrode 112, the second electrode 114, the third electrode 116 of the embodiment depicted in FIG. 1, but the patterns of the first electrode 412, the second electrode 414, the third electrode 416 are different from the first electrode 112, the second electrode 114, the third electrode 116.

In the present embodiment, the second electrode 414 includes a first pattern portion 414A and a second pattern portion 414B having substantially the same pattern design and electrically connected to each other to serve as one sensing electrode. The third electrode 416 includes a first pattern portion 416A, a second pattern portion 416B and a third pattern portion 416C electrically connected to one another to serve as one transmission electrode. The second pattern portion 416B of the third electrode 416 is located between the first pattern portion 416A and the third pattern portion 416C thereof. In addition, the first pattern portion 414A of the second electrode 414 is located between the first pattern portion 416A of the third electrode 416 and the third pattern portion 416C of the third electrode 416, the second pattern portion 414B of the second electrode 414 is located between the third pattern portion 416C of the third electrode 416 and the second pattern portion 416B of the third electrode 416, and the pattern of the first electrode 412 is wounded along with the first pattern portion 416A of the third electrode 416, the first pattern portion 414A of the second electrode 414, the third pattern portion 416C of the third electrode 416, the second pattern portion 414B of the second electrode 414, and the second pattern portion 416B of the third electrode 416. Simultaneously, the first electrode 412 is located between the second electrode 414 and the third electrode 416, between the second electrode 414 and the grounding electrode 118, and between the third electrode 416 and the grounding electrode 118.

Figure 6:
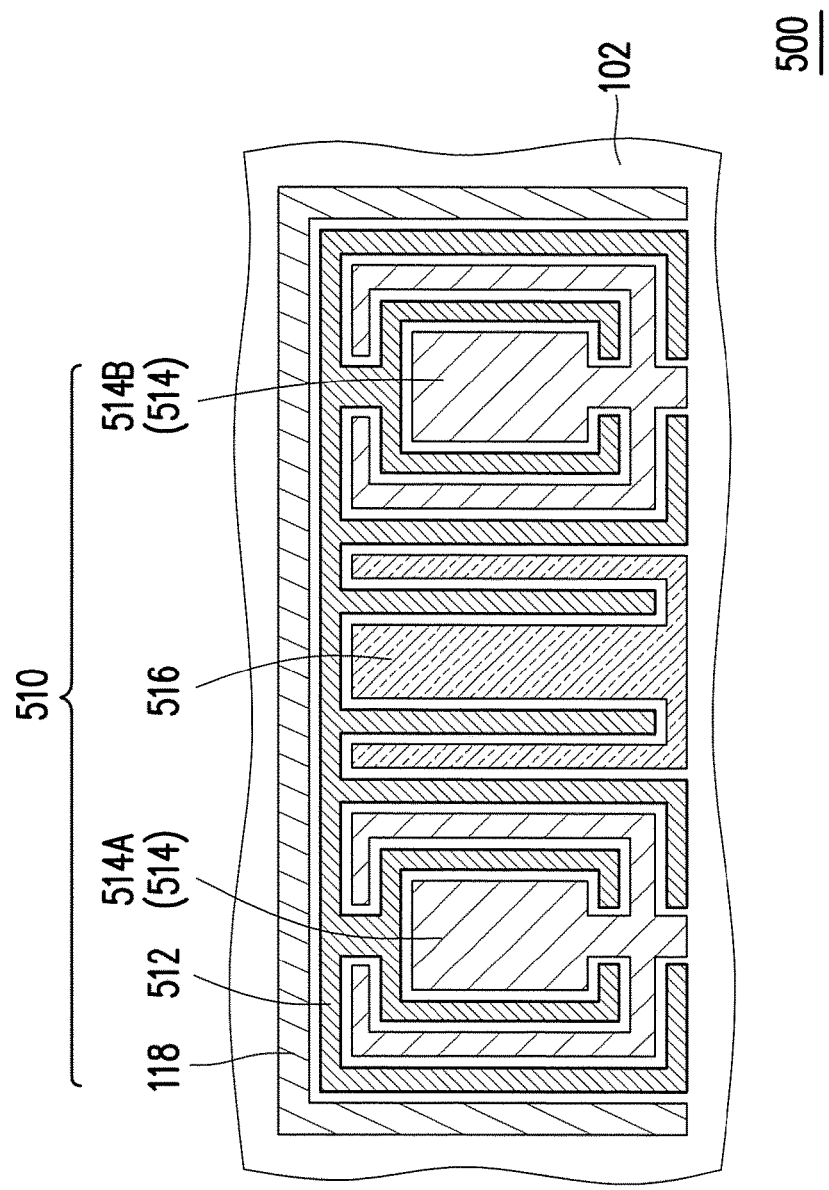
FIG. 6 schematically illustrates a touch sensor device in accordance with another embodiment of the present disclosure.

FIG. 6 schematically illustrates a touch sensor device in accordance with another embodiment of the present disclosure. Referring to FIG. 6, the touch sensor device 500 is substantially similar to the touch sensor device 100 so that the similar or the same reference numbers in the two embodiments may refer to similar or the same components. Specifically, the touch sensor device 500 includes a sensor pad 510 disposed on the carrier 102, in which the sensor pad 510 includes a first electrode 512, a second electrode 514, a third electrode 516 and a grounding electrode 118. Herein, the pattern design, the function and the disposition location of the grounding electrode 118 may refer to the embodiment of FIG. 1 and are not reiterated. In addition, the functions and the disposition relationships of the first electrode 512, the second electrode 514, the third electrode 516 may refer to the first electrode 112, the second electrode 114, the third electrode 116 of the embodiment depicted in FIG. 1, but the patterns of the first electrode 512, the second electrode 514, the third electrode 516 are different from the first electrode 112, the second electrode 114, the third electrode 116.

In the present embodiment, the second electrode 514 includes a first pattern portion 514A and a second pattern portion 514B and the second pattern portion 514B is electrically connected to the first pattern portion 514A to serve as one sensing electrode. The third electrode 516 is located between the first pattern portion 514A and the second pattern portion 514B of the second electrode 514. In addition the pattern of the first electrode 512 is wounded along with the first pattern portion 514A of the second electrode 514, the third electrode 516, and the second pattern portion 514B of the second electrode 514.

Figure 7:
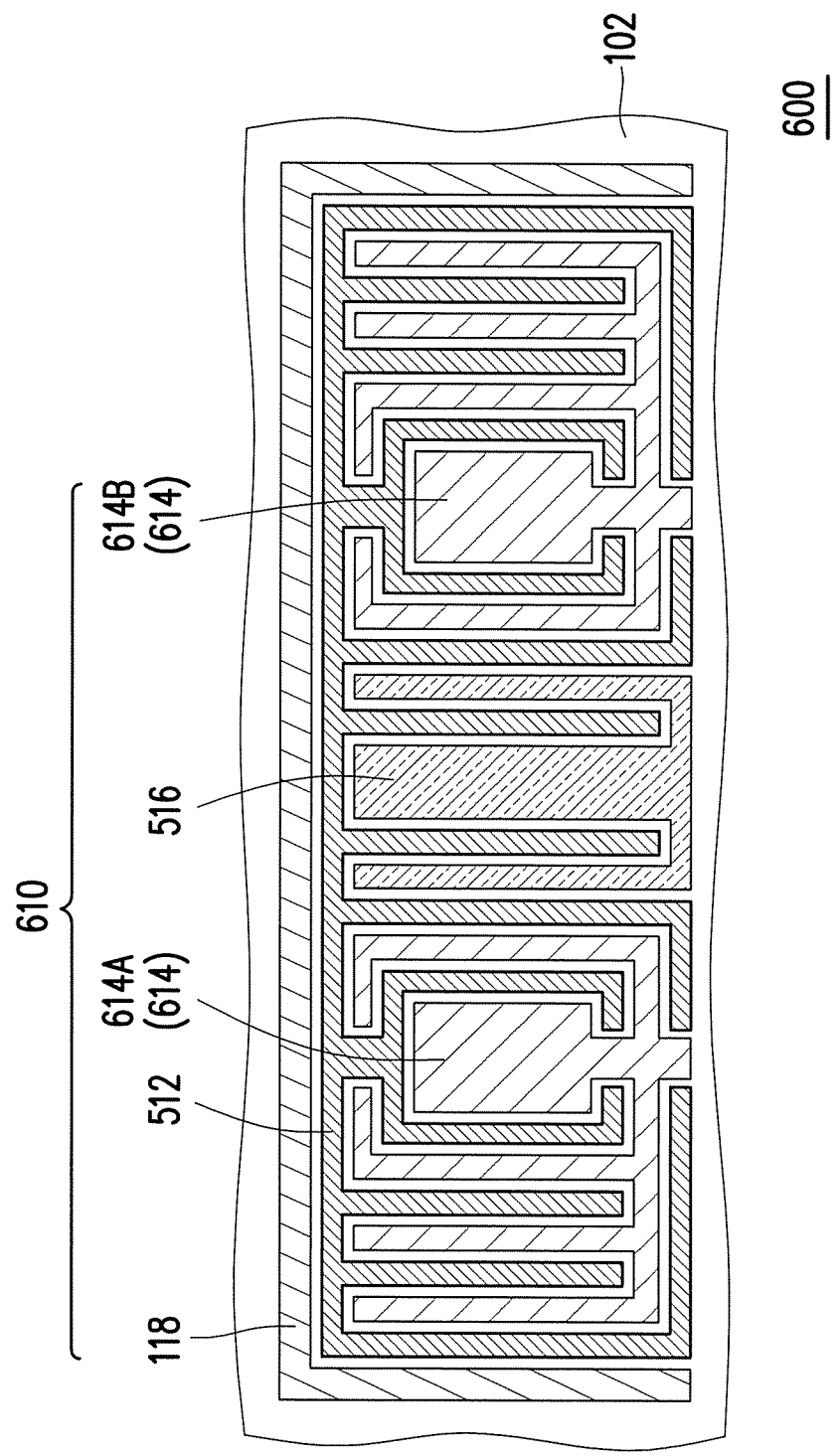
FIG. 7 schematically illustrates a touch sensor device in accordance with another embodiment of the present disclosure.

FIG. 7 schematically illustrates a touch sensor device in accordance with another embodiment of the present disclosure. Referring to FIG. 7, the touch sensor device 600 is substantially similar to the touch sensor device 500 of FIG. 6 so that the similar or the same reference numbers in the two embodiments may refer to similar or the same components. Specifically, the touch sensor device 600 includes a sensor pad 610 disposed on the carrier 102, in which the sensor pad 610 includes a first electrode 512, a second electrode 614, a third electrode 516 and a grounding electrode 118. Herein, the pattern designs, the functions and the disposition locations of the first electrode 512, the third electrode 516 and the grounding electrode 118 may refer to the embodiment of FIG. 6 and are not reiterated. Specifically, the difference between the touch sensor device 600 and the touch sensor device 500 substantially lies in that the pattern design of the second electrode. In the present embodiment, the second electrode 614 includes a first pattern portion 614A and a second pattern portion 614B. The first pattern portion 614A and the second pattern portion 614B have the same pattern design that is different from the pattern design of the first pattern portion 514A and the second pattern portion 514B of the second electrode 514 in the touch sensor device 500.

It is noted that the pattern design of the respective electrode in the sensor pad is not limited to any of the above embodiments and may be modified according to the requirements of a touch sensor device. For example, a complex pattern design may result in a larger sensing capacitance, so that the pattern design of the respective electrode in the sensor pad may be determined by the circuit design of the touch sensing driving circuit.

Figure 8:
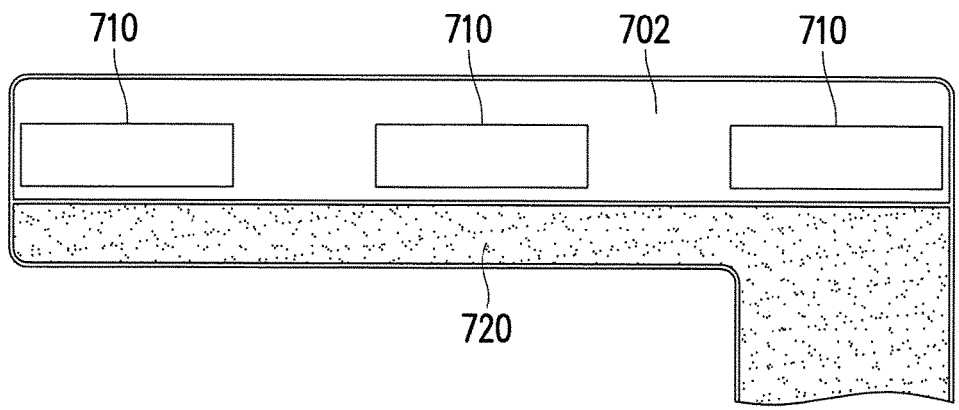
FIG. 8 schematically illustrates a top view of a touch sensor device in accordance with a further embodiment of the present disclosure.
Figure 9:
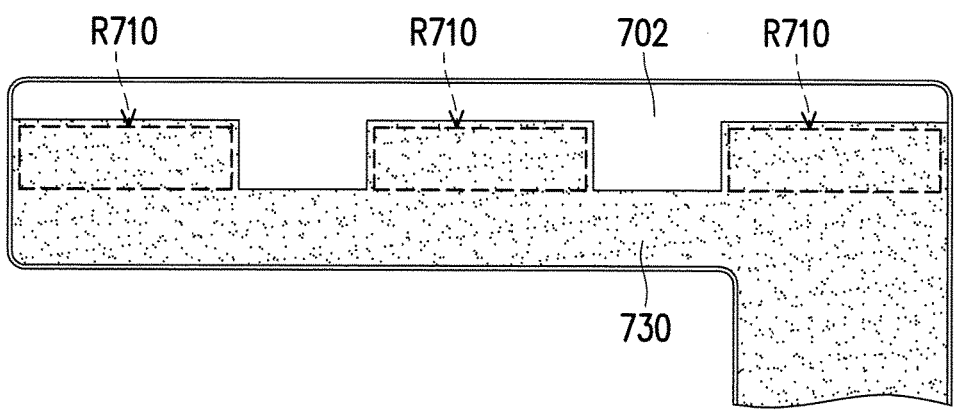
FIG. 9 schematically illustrates a bottom view of a touch sensor device of FIG. 8.

FIG. 8 schematically illustrates a top view of a touch sensor device in accordance with a further embodiment of the present disclosure. Referring to FIG. 8, a touch sensor device 700 includes a carrier 702, a plurality of sensor pads 710 and a shielding film 720. The carrier 702 may be a flexible printed circuit board. The sensor pads 710 are disposed on the carrier 702 and may be fabricated by one conductive layer in the flexible printed circuit board. The shielding film 720 is disposed beside the sensor pads 710 and reveals the sensor pads 710. The shielding film 720 provides the electromagnetic interference (EMI) shielding function for ensuring the reliability of the touch sensor device 700. In addition, each of the sensor pads 710 may have the pattern design as depicted in any of the embodiments of FIGS. 1, 3, 4, 5, 6 and 7. In addition, FIG. 9 schematically illustrates a bottom view of a touch sensor device of FIG. 8. In the present embodiment, the touch sensor device 700 further includes a backside shielding film 430 disposed at the back side of the carrier 702. In other words, the shielding film 720 depicted in FIG. 8 and the backside shielding film 730 depicted in FIG. 9 are disposed at opposite sides of the carrier 702. The backside shielding film 430 covers the region R710 corresponding to the disposition location of the sensor pads 710 that are shown in the top view of FIG. 8. The backside shielding film 430 also provides the electromagnetic interference (EMI) shielding function for ensuring the reliability of the touch sensor device 700.

In light of the foregoing, the touch sensor device according to an embodiment of the present disclosure includes two transmission electrodes, one sensing electrode and one grounding electrode, where one of the two transmission electrodes is located between adjacent two of the other electrodes. The two transmission electrodes may be enabled asynchronously such that the sensing electrode may sense different sensing capacitances with respect to the respective enablement of the transmission electrodes. In addition, the variations of the two sensing capacitances may vary in the same tendency in response to an actual touch activity while vary in different tendencies in response to a water drop on the sensor device. Therefore, the touch sensor device can accurately distinguish the ghost point touch sensing signal from the actual touch sensing signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch sensor device comprising a sensor pad disposed on a carrier, wherein the sensor pad comprises:
   a first electrode;
   a second electrode, wherein the first electrode surrounds a periphery of the second electrode and a first gap is formed between the first electrode and the second electrode;
   a third electrode, wherein the first electrode surrounds a periphery of the third electrode, and a second gap is formed between the first electrode and the third electrode;
   a grounding electrode, surrounding a periphery of the pad sensor, wherein a third gap is formed between the first electrode and the grounding electrode; and
   a shielding film disposed on the carrier and located at a side of the sensor pad, wherein the shielding film reveals the sensor pad,
   a backside shielding film disposed on the carrier, wherein the shielding film and the backside shielding film are located at opposite sides of the carrier, and the backside shielding film covers a region corresponding to the sensor pad.

2. The touch sensor device according to claim 1, wherein the first electrode, the second electrode and the third electrode are coplanar.

3. The touch sensor device according to claim 1, wherein the first electrode, the second electrode, the third electrode and the grounding electrode are coplanar.

4. The touch sensor device according to claim 1, wherein the first electrode is located between the second electrode and the third electrode.

5. The touch sensor device according to claim 1, wherein the first electrode is located between the second electrode and the grounding electrode.

6. The touch sensor device according to claim 1, wherein the first electrode is located between the third electrode and the grounding electrode.

7. The touch sensor device according to claim 1, wherein the second electrode is electrically coupled to the first electrode to form a first sensing capacitance and electrically coupled to the third electrode to form a second sensing capacitance.

8. The touch sensor device according to claim 1, wherein the first electrode and the third electrode are asynchronously enabled to perform a touch sensing scan.

9. The touch sensor device according to claim 8, wherein one of the first electrode and the third electrode is connected to a ground voltage and the other of the first electrode and the third electrode is enabled to perform the touch sensing scan.

10. The touch sensor device according to claim 1, wherein a pattern of the first electrode is wounded along with the second electrode and the third electrode.

11. The touch sensor device according to claim 1, wherein the grounding electrode surrounds a region and the first electrode, the second electrode and the third electrode are located within the region.

* * * * *